United States Patent [19]

Morikane et al.

[11] Patent Number: 4,754,184
[45] Date of Patent: Jun. 28, 1988

[54] BRUSH ASSEMBLY FOR A DYNAMOELECTRIC MACHINE

[75] Inventors: Hiroyuki Morikane; Miyuki Takata, both of Himeji, Japan

[73] Assignee: Mitsubishi Denki Kabushiki Kaisha, Japan

[21] Appl. No.: 21,489

[22] Filed: Mar. 4, 1987

[30] Foreign Application Priority Data

Mar. 5, 1986 [JP] Japan .............................. 61-32745[U]

[51] Int. Cl.$^4$ ............................................. H02K 13/00
[52] U.S. Cl. ...................................... 310/239; 310/42; 310/89; 310/91
[58] Field of Search ................. 310/42, 239, 240, 241, 310/292, 294, 245, 246, 247, 238, 89, 91, 43, 45, 248

[56] References Cited

U.S. PATENT DOCUMENTS

| 1,375,658 | 4/1921 | Gilchrist | 310/239 |
| 1,926,441 | 9/1933 | Gilbert | 310/239 |
| 2,324,299 | 7/1943 | Haifley | 310/239 |
| 4,414,481 | 11/1983 | de Jong | 310/89 |
| 4,475,053 | 10/1984 | Mayer | 310/239 |
| 4,538,085 | 8/1985 | Tanaka | 310/239 |
| 4,673,838 | 6/1987 | Takagi | 310/239 |

FOREIGN PATENT DOCUMENTS

| 2249684 | 4/1974 | Fed. Rep. of Germany | 310/239 |
| 2028005 | 2/1980 | United Kingdom | 310/239 |
| 2075276 | 11/1981 | United Kingdom | 310/239 |

Primary Examiner—R. Skudy
Attorney, Agent, or Firm—Leydig, Voit & Mayer

[57] ABSTRACT

A brush assembly for use with a commutator of a dynaomoelectric machine comprises an electrically insulating housing having an integral main body and a flat planar cover which, when assembled, define together a plurality of radially extending brush holders between them. Brush elements are slidably disposed within the brush holders of the housing, and brush springs are disposed for biasing the brush elements radially inwards to establish a pressure contact with the commutator segments of the dynamoelectric machine. In order to hold the cover and the main body together in an assembled condition, holding elements mountable to the dynamoelectric machine while maintaining the assembled condition of the cover and the housing main body are provided.

13 Claims, 2 Drawing Sheets

BRUSH ASSEMBLY FOR A DYNAMOELECTRIC MACHINE

BACKGROUND OF THE INVENTION

This invention relates to a brush assembly for use with a commutator of a dynamoelectric machine.

FIGS. 1 and 2 illustrate one example of a conventional brush assembly for a dynamoelectric machine in which an annular base plate 4 made of an electrically conductive plate is provided around a commutator 2 of a dynamoelectric machine. The base plate 4 can be directly mounted to the frame (not shown) of the dynamoelectric machine by a suitable fastening means such as screws (not shown) extending through holes 6 formed in the base plate 4. Thus, a direct electrical connection is established between the machine frame and the base plate 4. The base plate 4 has secured thereon a pair of brush holders 8a and 8b for slidably holding therein brush elements 10a and 10b, respectively. The brush elements 10a and 10b are in electrical contact with the brush holders 8a and 8b, and the holders 8a and 8b are electrically connected to the base plate 4 by means of lead conductors 12a and 12b. Thus, the brush elements 10a and 10b are used as brushes for the minus side. In order to establish a good electrical contact between the brush elements 10a and 10b and the commutator 2, brush springs 14 are disposed between the base plate 4 and the radially outer ends of the brush elements 10a and 10b.

The base plate 4 is also provided thereon with a pair of plus side brush elements 16a and 16b which are radially slidably supported by the brush holders 18a and 18b and biased toward the commutator 2 of the dynamoelectric machine by means of springs 20. In order to electrically insulate the brush holders 18a and 18b from the base plate 4, the brush holders 18a and 18b are mounted on the base plate 4 with electrically insulating plastic sheets 22a and 22b interposed therebetween as best seen in FIG. 2. It can be seen from FIG. 2 that the brush holder 18a is secured to the insulating sheet 22a by grommets 24, and the insulating sheet 22a is secured to the base plate 4 by means of the screws (not shown) for mounting the base plate to the machine frame. The brush holders 18a and 18b are electrically connected through lead conductors 26a and 26b to one end of the lead 28 the other end of which is connected to the terminal plate 30.

With the above structure, two electrically insulating plastic sheets 22a and 22b are necessary in order to electrically insulate the plus side brush elements 16a and 16b as well as the brush holders 18a and 18b from the base plate 4. Also, since the grommets 24 are used, time-consuming operations for forming the grommets 24 must be carried out, and there is the risk of damaging the insulating plastic sheets 22a and 22b during the grommet forming operation.

SUMMARY OF THE INVENTION

Accordingly, an object of the present invention is to provide a brush assembly for a dynamoelectric machine free from the above discussed disadvantages of the conventional brush assembly.

Another object of the present invention is to provide a brush assembly for a dynamoelectric machine in which the number of parts is significantly reduced as compared to the conventional assembly.

Still another object of the present invention is to provide a brush assembly for a dynamoelectric machine in which the grommets are not used.

A further object of the present invention is to provide a brush assembly for a dynamoelectric machine which can be easily and quickly assembled.

With the above objects in view, the present invention provides a brush assembly for use with a commutator of a dynamoelectric machine comprising an electrically insulating housing having an integral main body and a flat planar cover which, when assembled, define a plurality of radially extending brush holders between them. The brush assembly also comprises elements which are slidably disposed within the brush holders of the housing and brush springs which bias the brush elements radially inward to establish a pressure contact with the commutator segments of the dynamoelectric machine. The brush assembly further comprises apparatus for holding the cover and the main body together in an assembled condition. To maintain the assembled condition of the cover and the main body, this holding apparatus is mountable to the dynamoelectric machine includes at least two holders which engage the main body and the cover from different radial directions. The insulating housing includes at least two forked projections extending in different radial directions and engaged by the holders.

The present invention further provides a brush assembly comprising an electrically insulating housing which includes a main body, a cover mounted on the main body, first and second forked projections which extend from the periphery of the housing in different radial directions, and a plurality of radially extending brush holders defined between the main body and the cover. The brush assembly also comprises brush elements disposed in the brush holders and capable of sliding within the brush holders and brush springs disposed in the brush holders for biasing the brush elements radially against a commutator. The brush assembly further comprises first and second holders, each holder having first and second opposing surfaces and engaging one of the forked projections in order to sandwich the main body and the cover between the first and second opposing surfaces, thereby securing the cover to the main body. The holders and the brush assembly may be mounted to a dynamoelectric machine.

BRIEF DESCRIPTION OF THE DRAWINGS

The present invention will become more readily apparent from the following detailed description of the preferred embodiment of the present invention taken in conjunction with the accompanying drawings, in which.

DETAILED DESCRIPTION OF THE PREFERRED EMBODIMENTS

Figure 1:
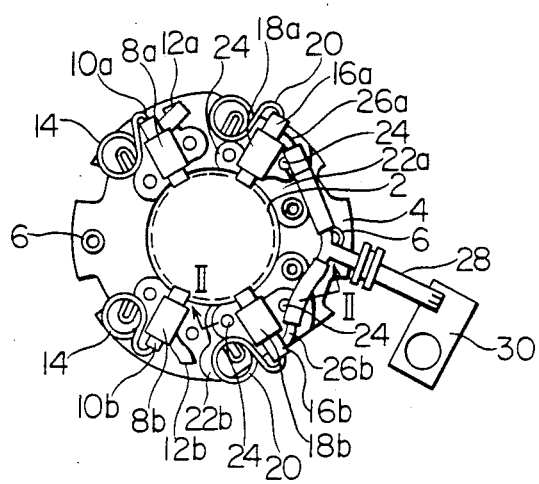
FIG. 1 is a front view showing a conventional brush assembly for a dynamoelectric machine.
Figure 2:
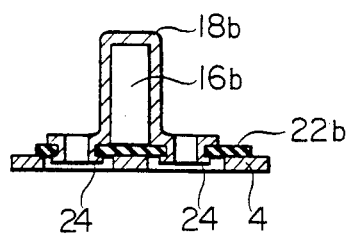
FIG. 2 is a sectional view taken along the line II—II of FIG. 1.
Figure 3:
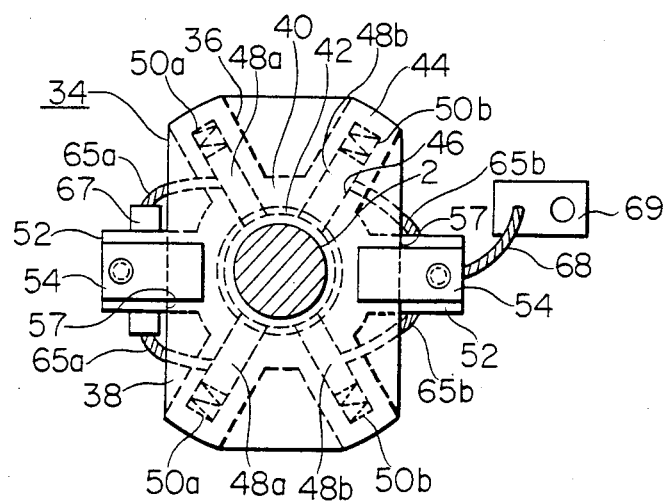
FIG. 3 is a front view showing a brush assembly of the present invention.
Figure 4:
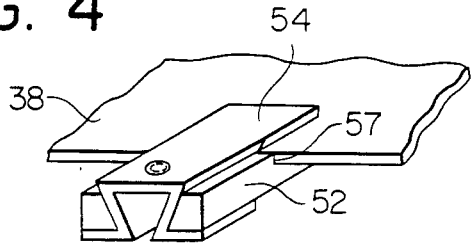
FIG. 4 is a perspective view of the holder of the brush assembly shown in FIG. 1.
Figure 5:
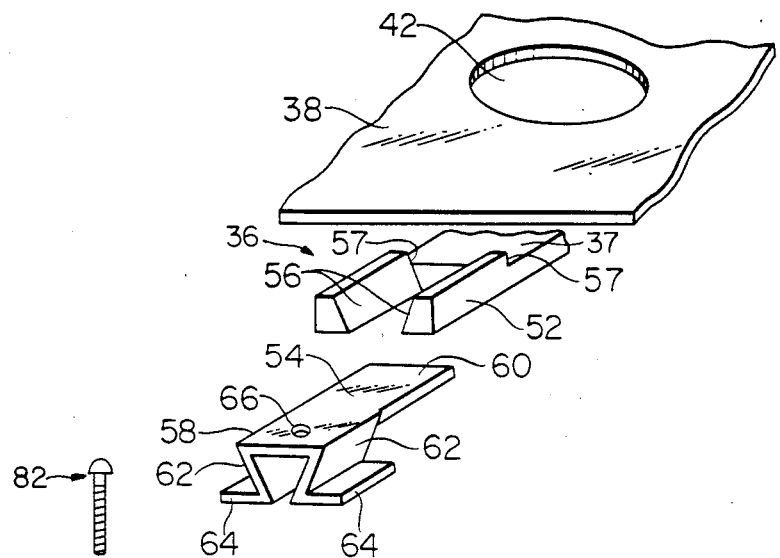
FIG. 5 is an exploded perspective view of the holder of the brush assembly.

FIGS. 3, 4, and 5 illustrate one embodiment of a brush assembly for use with a commutator of a dynamoelectric machine of the present invention. The brush assembly comprises an electrically insulating housing 34 comprising an integral main body 36 (shown in hidden lines in FIG. 3) having a flat planar cover 38 disposed thereon. The main body 36 has a substantially annular central portion 40 having a bore 42 for allowing the passage of the commutator 2 of the dynamoelectric machine therethrough. The central portion 40 is provided with four holder portions 44 which are integrally formed with the central portion 40 and extend radially outwards therefrom. The main body 36 has a flat planar surface 37 on one side. Each of the holder portions 44 includes a radial groove 46 in the planar surface for slidably receiving therein a brush element toward the commutator 2.

In order to close the radial grooves 46 in the holder portions 44 of the housing main body 36 and define the radially extending brush holders, the planar cover 38 is placed on the flat surface 37 of the main body 36 and the brush elements 48a and 48b radially inwardly biased by the springs 50a and 50b are slidably disposed therein.

In order to secure the cover 38 to the housing main body 36, the main body 36 comprises holding means which can be mounted to the end bracket 80 of the dynamoelectric machine while maintaining the assembled condition of the housing main body 36 and the cover 38. The holding means, in the illustrated embodiment, comprises two forked projections 52, each having a pair of legs and extending in opposite radial directions. Two holders 54 slidably engage both of the forked projections 52 and the cover 38. The directions of sliding engagement of the holders 54 are radially towards each other. Each of the legs of the projections 52 have a trapezoidal cross section and have a slanted surface 56 on their opposing inner surfaces. The projections 52 are also provided with a step 57 which forms an elevated surface higher than the flat upper surface 37 of the housing main body 36. The steps 57 serve as stops against the lateral movement of the cover 38 with respect to the main body 36.

Each of the holders 54 is a member made of a metal plate bent to form a configuration as best illustrated in FIG. 5. The holder 54 comprises a dove-tailed portion 58 having two sides connected by a bridge and a flat extension 60 extending from the bridge. The dove-tailed portion 58 has slanted surfaces 62 on its both sides which, when assembled, engage the slanted surfaces 56 of the forked projections 52. The dove-tailed portion 58 also has bottom tabs 64 which, in the illustrated embodiment, extend outwardly from the narrow bottom end of the dove-tailed portion 58 generally parallel to the flat extension 60. The top surface of the tabs 64 engage the bottom surfaces of the legs of the projections 52. Thus, when the holder 54 is slidably inserted from the outer end of the projections 52 with the slanted surfaces 62 and the tabs 64 brought into engagement with the slanted surfaces 56, a dove-tail engagement is established between the holder 54 and the projections 52. When the holder 54 is inserted between the legs of the projections 52, the bottom surface of the flat extension 60 extends over the top surface of the cover 38, the top surfaces of the tabs 64 and the bottom surface of the extension 60 acting as opposing surfaces sandwiching the cover and main body together. The holder 54 is provided at the dove-tailed portion 58 with a threaded hole 66. As shown in FIG. 5, a screw 82 engages the end bracket 80 of the dynamoelectric machine through the threaded hole 66 to rigidly secure the holder 54 and therefore the whole brush assembly.

In order to establish electrical connection to an external circuit, electrical conductors 65a and 65b are provided. The conductors 65a are for the plus side and the conductors 65b are for the minus side. One end of each of the electrical conductors 65a extend through the holder portion 44 and are electrically connected to the brush elements 48a. The other end of the conductor 65a is connected to a terminal tab 67 integrally formed on the holder 54. The minus side conductors 65b are similarly connected at one end to the brush elements 48b. The other ends of the conductors 65b are connected to a lead 68 electrically connected to a terminal plate 69.

Figure 6:
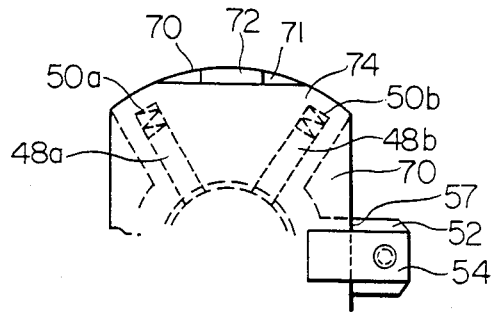
FIG. 6 is a fragmental front view illustrating another embodiment of the brush assembly of the present invention.

FIG. 6 illustrates another embodiment of the present invention in which the integral, insulating housing main body 70 includes a projection 72 formed in the flat planar surface 71. The projection 72 serves as a stop surface for preventing a radial, up and down (in FIG. 6) movement of a cover plate 74 relative to the main body 70.

As apparent from the foregoing description, the insulating housing of the brush assembly of the present invention has an integral main body and a flat planar cover which, when assembled, define together a plurality of radially extending brush holders between them, and the cover and the main body are secured together by a holding means which also rigidly mounts them to the dynamoelectric machine. Therefore, the number of parts of the assembly is significantly reduced because the housing main body is of an integral structure and the insulating plastic plates used between the brush holders and the base plate for electrical insulation in the conventional assembly are not necessary. Also, since no grommets are used, the time-consuming operation for forming such grommets with the concomitant risk of damaging the insulating plastic plates during the grommet forming operation is not necessary.

What is claimed is:

1. A brush assembly for use with a commutator of a dynamoelectric machine comprising:

an electrically insulating housing having an integral main body and a flat planar cover which, when assembled, define a plurality of radially extending brush holders therebetween;

brush elements slidably disposed within said brush holders of said housing;

brush springs for biasing said brush elements radially inwardly to establish a pressure contact with the commutator segments of the dynamoelectric machine; and holding means for holding said cover and said main body together in an assembled condition, said holding means comprising at least two holders slidably engaging said main body and said cover from different radial directions and being mountable to the dynamoelectric machine while maintaining said assembled condition and said insulating housing including at least two forked projections extending in different radial directions for being sliably engaged by said holders.

2. A brush assembly as claimed in claim 1 wherein each of said holders comprises a dove-tailed portion and a flat extension extending from said dove-tailed portion, said dove-tailed portion engaging said forked projection, and said flat extension engaging said cover.

3. A brush assembly as claimed in claim 2 wherein said holders comprises a bent metal plate.

4. A brush assembly as claimed in claim 1 wherein said insulating housing includes a flat planar surface and at least two stop surfaces on said flat planar surface for preventing radial movement of said cover relative to said main body.

5. A brush assembly for a dynamoelectric machine having a commutator, said brush assembly comprising:
an electrically insulating housing including a main body, a cover mounted on said main body, first and second forked projections extending from the periphery of said housing in different radial directions, and a plurality of radially extending brush holders defined between said main body and said cover;
brush elements slidably disposed in said brush holders;
brush springs disposed in said brush holders and biasing said brush elements radially against the commutator; and
first and second holders, each of said holders having first and second opposing surfaces and slidably engaging one of said forked projections and sandwiching said main body and said cover between said first and second opposing surfaces to secure said cover to said main body, said holders further having means for mounting said holders and the brush assembly to the dynamoelectric machine.

6. A brush assembly as claimed in claim 5 wherein each of said forked projections has a pair of legs.

7. A brush assembly as claimed in claim 6 wherein each of said legs has an elevated surface comprising a stop, said stops preventing relative motion of said cover and said main body.

8. A brush assembly as claimed in claim 6 wherein each of said holders is disposed between said pair of legs of one of said forked projections.

9. A brush assembly as claimed in claim 8 wherein each of said holders comprises two sides, a bridge extending between said sides, an extension extending inwardly from said bridge, and two tabs, each tab extending from one of said sides generally parallel to said extension, said first opposing surface of each of said holders comprising a surface of said extension and said second opposing surface of each of said holders comprising a surface of each of said tabs.

10. A brush assembly as claimed in claim 9 wherein said mounting means comprises a screw and a corresponding a threaded hole disposed in one of said holders.

11. A brush assembly as claimed in claim 9 wherein each of said legs of said projections comprises a trapezoidal cross-section and has a first surface and said pair of legs has slanted opposing inner surfaces, wherein each of said holders comprises a dove-tailed cross-section and said sides of each of said holders have slanted surfaces extending generally parallel to said slanted opposing inner surfaces of said legs, and wherein said second opposing surface of said tabs slidably engages said first surface of each of said legs and said slanted side surfaces of each of said holders slidably engage said slanted opposing inner surfaces of said legs whereby a dove-tail engagement is established between said holders and said projections.

12. A brush assembly as claimed in claim 11 wherein said projections extend from the periphery of said main body and wherein said first opposing surface on each of said extensions slidably engages said cover.

13. A brush assembly as claimed in claim 5 wherein said main body includes at least two elevated surfaces, each comprising a stop, said stops preventing relative motion of said cover and said main body.

* * * * *